(12) United States Patent
Fekl

(10) Patent No.: US 10,497,283 B2
(45) Date of Patent: Dec. 3, 2019

(54) MOLECULAR MODELS

(71) Applicant: RealAtoms Inc., Etobicoke (CA)

(72) Inventor: Ulrich Werner Fekl, Etobicoke (CA)

(73) Assignee: RealAtoms Inc., Etobicoke (CA)

( * ) Notice: Subject to any disclaimer, the term of this patent is extended or adjusted under 35 U.S.C. 154(b) by 234 days.

(21) Appl. No.: 15/812,252

(22) Filed: Nov. 14, 2017

(65) Prior Publication Data

US 2018/0144660 A1   May 24, 2018

Related U.S. Application Data

(60) Provisional application No. 62/424,659, filed on Nov. 21, 2016.

(51) Int. Cl.
*G09B 23/26* (2006.01)
*G09B 23/24* (2006.01)

(52) U.S. Cl.
CPC ........... *G09B 23/26* (2013.01); *G09B 23/24* (2013.01)

(58) Field of Classification Search
USPC ............... 434/277, 278, 279, 281, 283, 298; 446/92
See application file for complete search history.

(56) References Cited

U.S. PATENT DOCUMENTS

| | | | | |
|---|---|---|---|---|
| 2,308,402 A | * | 1/1943 | Taylor | G09B 23/26 434/278 |
| 5,746,638 A | * | 5/1998 | Shiraishi | A63H 33/046 446/131 |
| 5,947,745 A | * | 9/1999 | Tempelman | G09B 23/20 434/278 |
| 6,508,652 B1 | * | 1/2003 | Kestyn | G09B 23/26 434/278 |
| 6,749,480 B1 | * | 6/2004 | Hunts | A63H 33/046 446/85 |
| 7,465,169 B2 | * | 12/2008 | Roth | G09B 23/26 434/278 |
| 2006/0099877 A1 | | 5/2006 | Anderson | |

(Continued)

FOREIGN PATENT DOCUMENTS

WO    2013080206    6/2013

OTHER PUBLICATIONS

Indigo Instruments "AtoMag Magnetic Molecular Models", retrieved from the Internet on May 16, 2016, https://www.indigo.com/molecular_models/atomag/#.VzpJySF49VY.

(Continued)

*Primary Examiner* — Kurt Fernstrom
(74) *Attorney, Agent, or Firm* — Bereskin & Parr LLP/S.E.N.C.R.L., s.r.l.

(57) ABSTRACT

A base unit for use in forming a molecular model has a polyhedral body having a first set of faces defining a plurality of first attachment surfaces, and a second set of faces defining a plurality of second attachment surfaces. A first set of the plurality of second attachment surfaces has a North magnetic polarity, and a second set of the plurality of second attachment surfaces has a South magnetic polarity. The base unit is magnetically coupleable to another base unit in a first configuration in which rotation of the base unit relative to the another unit is inhibited, and in a second configuration in which rotation of the base unit relative to the another unit is not inhibited.

20 Claims, 14 Drawing Sheets

(56) References Cited

U.S. PATENT DOCUMENTS

| | | | | |
|---|---|---|---|---|
| 2009/0035742 A1* | 2/2009 | Snelson | ................ | G09B 23/06 434/277 |
| 2010/0168439 A1 | 7/2010 | Olson | | |
| 2016/0199749 A1* | 7/2016 | Whittaker | ............ | H01F 7/0252 434/278 |

OTHER PUBLICATIONS

NlaCL Lattice "Magnetic Sodium Chloride Ions", retrieved from the Internet on May 13, 2016, http://www.3dmoleculardesigns.com/Education-Products/NaCl-Lattice.htm.

Indiegogo "Snatoms! The Magnetic Molecular Modeling Kit", retrieved from the Internet on May 13, 2016, https://www.indiegogo.com/projects/snatoms-the-magnetic-molecular-modeling-kit.

Water Kit "Magnetic Water Molecules", retrieved from the Internet on May 13, 2016, http://www.3dmoleculardesigns.com/Education-Products/Water-Kit.htm.

Happy Atoms "Introducing Happy Atoms", retrieved from the Internet on Jan. 31, 2018, https://happyatoms.com/.

* cited by examiner

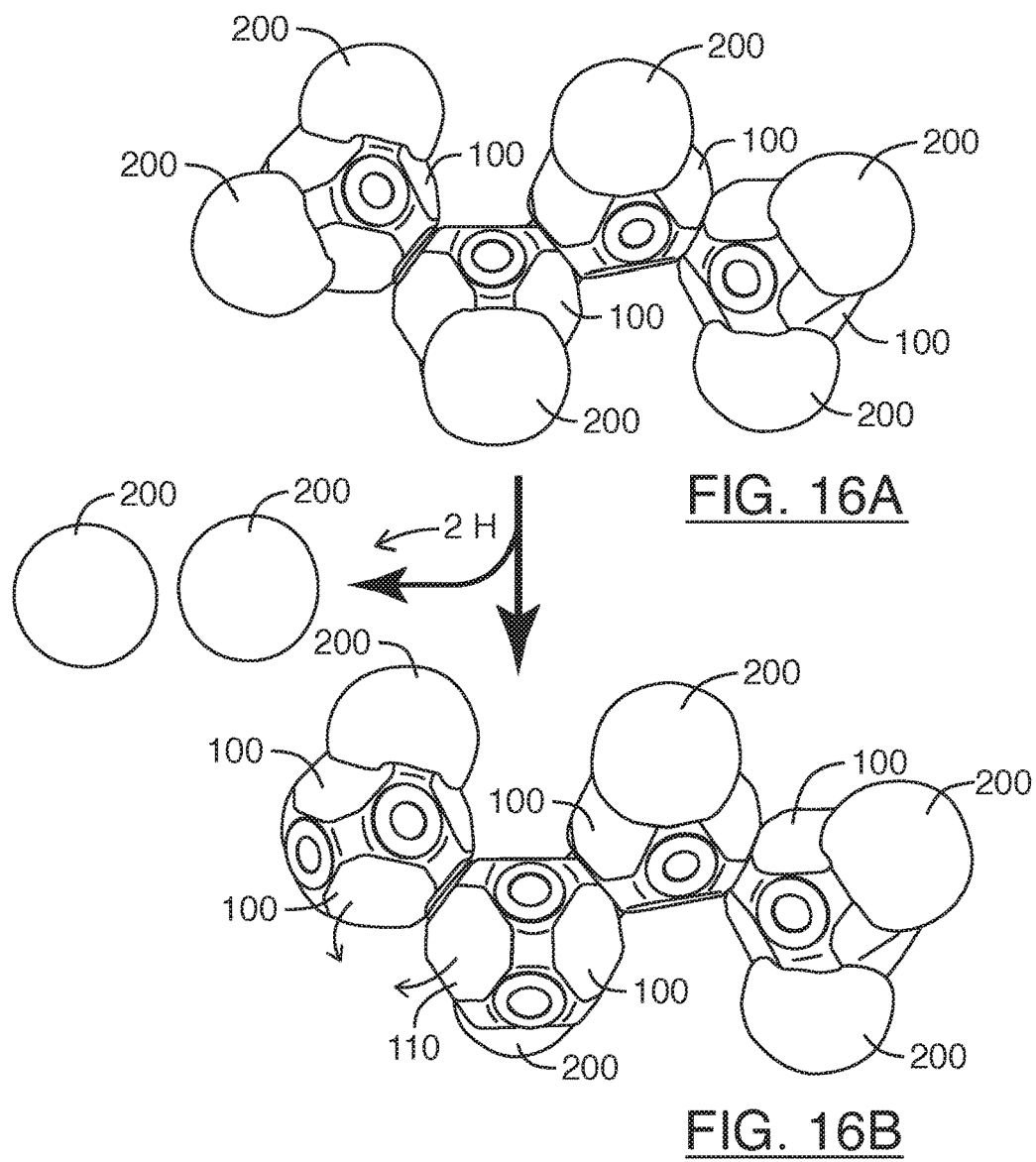
FIG. 16A
FIG. 16B
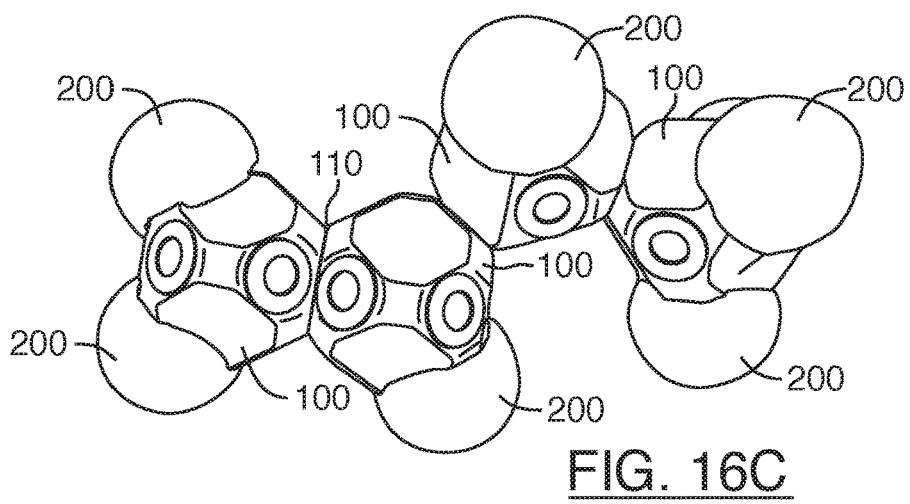
FIG. 16C

MOLECULAR MODELS

CROSS-REFERENCE TO RELATED APPLICATIONS

This application claims the benefit of U.S. Provisional Application No. 62/424,659, entitled "MOLECULAR MODELS", filed on Nov. 21, 2016. The entire contents of U.S. Provisional Application No. 62/424,659 are hereby incorporated by reference.

FIELD

This disclosure relates generally to physical molecular models, and more specifically to physical molecular models that may be useful for modeling chemical reactions and/or dynamic aspects of stereochemistry.

INTRODUCTION

Chemistry involves reasoning and imagination related to three-dimensional objects. Physical molecular models are an important tool for teaching these skills, in particular in lower-year classes where computer modeling is not yet fully appropriate, for students who learn best with haptic experience ('tinkering'), and also for students with a visual disability.

While physical models are being used mostly by college students, active users range from high school students to Nobel-prize winning senior scientists. Many popular model kits are based on the ball-and-stick approach, for example, the Molymod™ model or the Orbit™ model. In these models, a given atom has connectors, placed at predetermined bond angles, around it, and sticks are used to model the bonds. Models that emphasize angles and the framework of a structure instead of the actual atoms are the Darling™/ Molecular Visions™ models.

Some molecular model kits, such as the Snatoms™ kit, use magnetic attractions to bond atoms in predetermined geometries.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

Disclosed herein are physical (hardware) molecular models that allow users to model chemical reactions in a more realistic manner by allowing the geometry at an atom to change. In existing physical models, the coordination geometry around an atom is inflexible, with the effect that chemically relevant geometry changes cannot be smoothly modeled. Rearranging sticks or replacing atoms is necessary, which severely hinders the use of such models in e.g. demonstrations. Consequently, physical models are underutilized where they could be potentially most useful: in the teaching of chemical reactions and the dynamic aspects of stereochemistry.

The lack of flexibility in existing hardware models may result from at least two issues: First, assembling bonds may typically be considered as slow and/or tedious. Also, assembling bonds using typical physical models (e.g. by rearranging sticks and/or balls) may be characterized as inconsistent with or counter to physical reality, where attractive and repulsive forces act in space, and an energetic minimum structure naturally falls into place. Second, the coordination geometry around an atom is flexible in reality, but rigid in typical physical models. This remains a huge problem of physical hardware models, preventing the smooth demonstration of chemical transformations.

While some physical models appear to be directed to addressing this first issue (e.g. by incorporating magnetic coupling), existing models do not appear to address this second issue, e.g. by facilitating a more fluid demonstration of structural change. Aspects of this disclosure address both of these issues.

In accordance with one aspect of this disclosure, a base unit is provided that can be coupled to other base units, where the base units represent atoms and are substantially polyhedral in shape. A base unit may be coupled to other base units at one or more attachment surfaces on the face of the polyhedron underlying the shape of a base unit. Each base unit contains a plurality of such attachment surfaces, such that a base unit can be attached or coupled to one or more other base units. If base units are coupled, they model atoms that are bonded. The attachment or coupling between base units can be realized using magnetic attraction.

A base unit may be of exact or approximate $O_h$ (name of the point group) symmetry, also known as octahedral or cubic symmetry. Examples of shapes having that symmetry are known as truncated cube, octahedron, great and small rhombicuboctahedron, cuboctahedron or stella octangula.

Magnetic attraction between base units may be generated by magnets of any shape, such as disk or rod magnets, ring magnets, or, alternatively, a base unit may be manufactured from a magnetic material. When magnetic attractions are used, they may include multipole-to-multipole attractions in addition to pole-to-pole attractions. An example of a multipole would be a quadrupole, and in one embodiment, the polarities may be alternatingly arranged such that: a) the set of North poles and South poles, combined, are arranged to form a cube (or an approximately cubic formation); and b) the set of North poles are arranged to form a tetrahedron (or an approximately tetrahedral formation) and the set of South poles are arranged to form a tetrahedron (or an approximately tetrahedral formation). Quadrupole-to-quadrupole attractions are intrinsically resistant to rotation, a property that they share with double bonds in real molecules. The base units, which resemble atoms, may have one or more textured surfaces, and resistance to rotation may be enhanced by using mating concave and convex surface features. This may result in reduction of the symmetry of the overall shape of the base unit. For example, providing one or more textured surfaces may reduce the symmetry of a base unit from the more symmetrical point group $O_h$ down to the slightly less symmetrical point group $T_d$.

In accordance with a broad aspect, there is provided a base unit for use in forming a molecular model, the base unit comprising: a polyhedral body having a first set of faces defining a plurality of first attachment surfaces, and a second set of faces defining a plurality of second attachment surfaces; and at least one magnet positioned relative to the plurality of second attachment surfaces such that a first set of the plurality of second attachment surfaces has a North polarity, and a second set of the plurality of second attachment surfaces has a South polarity; wherein the base unit is magnetically coupleable to another unit in the molecular model in a first configuration in which rotation of the base unit relative to the another unit is inhibited, and wherein the base unit is magnetically coupleable to the another unit in a second configuration in which rotation of the base unit relative to the another unit is not inhibited.

In some embodiments, in the first configuration, a first attachment surface of the base unit abuts a first attachment surface of the another unit.

In some embodiments, each first attachment surface comprises at least one projection and at least one recess configured such that when that first attachment surface abuts a complementary first attachment surface of the another unit, the at least one projection and the at least one recess engage the complementary first attachment surface of the another unit.

In some embodiments, in the second configuration, a second attachment surface of the base unit abuts a second attachment surface of the another unit.

In some embodiments, each second attachment surface is generally planar, such that when that second attachment surface abuts a complementary second attachment surface of the another unit, the abutted surfaces do not inhibit rotation of the base unit relative to the another unit.

In some embodiments, the base unit and the another unit may be reoriented from the first configuration to the second configuration while maintaining contact between the base unit and the another unit.

In some embodiments, the polyhedral body has or approximates $O_h$ symmetry.

In some embodiments, the polyhedral body has or approximates $T_d$ symmetry.

In some embodiments, the polyhedral body comprises a truncated cube, an octahedron, a great rhombicuboctahedron, a small rhombicuboctahedron, a cuboctahedron, a stella octangula, or a truncated stella octangula.

In some embodiments, the first set of the plurality of second attachment surfaces comprises four second attachment surfaces spaced from each other to form a first tetrahedron, the second set of the plurality of second attachment surfaces comprises four second attachment surfaces spaced from each other to form a second tetrahedron, and wherein the first tetrahedron and the second tetrahedron form a cube.

In some embodiments, the at least one magnet comprise at least one of a disk magnet, a rod magnet, and a ring magnet.

In some embodiments, the another unit is substantially identical to the base unit.

In accordance with another broad aspect, there is provided a base unit for use in forming a molecular model, the base unit comprising: a polyhedral body having a first set of faces defining a plurality of first attachment surfaces, and a second set of faces defining a plurality of second attachment surfaces, a first set of the plurality of second attachment surfaces having a North magnetic polarity, and a second set of the plurality of second attachment surfaces having a South magnetic polarity; wherein the base unit is magnetically coupleable to another base unit in a multipole-to-multipole orientation in which a first attachment surface of the base unit abuts a first attachment surface of the another base unit, and in which rotation of the base unit relative to the another unit is inhibited, and wherein the base unit is magnetically coupleable to the another base unit in a pole-to-pole orientation in which a second attachment surface of the base unit abuts a second attachment surface of the another base unit.

In some embodiments, the polyhedral body comprises a magnetic composite material magnetized to produce the North and South magnetic polarities.

In some embodiments, the base unit further comprises at least one first magnet to produce the North magnetic polarities and at least one second magnet to produce the South magnetic polarities.

In accordance with another broad aspect, a molecular modeling kit with a number of base units may be provided. A model kit may also be enhanced by including one or more capping units, where a capping unit has a reduced number of attachment surfaces compared to the base unit. These capping units can be useful to e.g. model hydrogen atoms, which often bond to only one other atom. If the base units incorporate magnetic attraction, a capping unit may contain a permanent magnet or, alternatively, a magnetic but not permanently magnetized material. Base units and/or capping units may be color-coded to represent different atoms. For example, some base units may be chosen to be colored black, in order to represent carbon atoms, others blue, to represent nitrogen atoms, and so on.

In accordance with this broad aspect, there is provided a molecular modeling kit comprising two or more base units, each base unit comprising: a polyhedral body having a first set of faces defining a plurality of first attachment surfaces, and a second set of faces defining a plurality of second attachment surfaces; and at least one magnet positioned relative to the plurality of second attachment surfaces such that a first set of the plurality of second attachment surfaces has a North polarity, and a second set of the plurality of second attachment surfaces has a South polarity; wherein the base unit is magnetically coupleable to another unit in the molecular model in a first configuration in which rotation of the base unit relative to the another unit is inhibited, and wherein the base unit is magnetically coupleable to the another unit in a second configuration in which rotation of the base unit relative to the another unit is not inhibited.

In some embodiments, the kit may further comprise at least one capping unit, each of the at least one capping unit having fewer attachment surfaces than each of the base units.

In some embodiments, each of the at least one capping unit has a single attachment surface.

In some embodiments, the at least one capping unit comprises a permanent magnet.

In some embodiments, the at least one capping unit comprises a paramagnetic or ferromagnetic material.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 16A is a perspective view of four of the base units and ten of the capping units of FIG. 13, coupled to each other to model an n-butane molecule;

FIG. 16B is a perspective view of the base units and capping units of FIG. 16A, with two of the capping units de-coupled from the base units;

FIG. 16C is a perspective view of the base units and eight of the capping units of FIG. 16B, after one of the base unit has been reoriented with respect to the other base units to model a 1-butene molecule;

Figure 1:
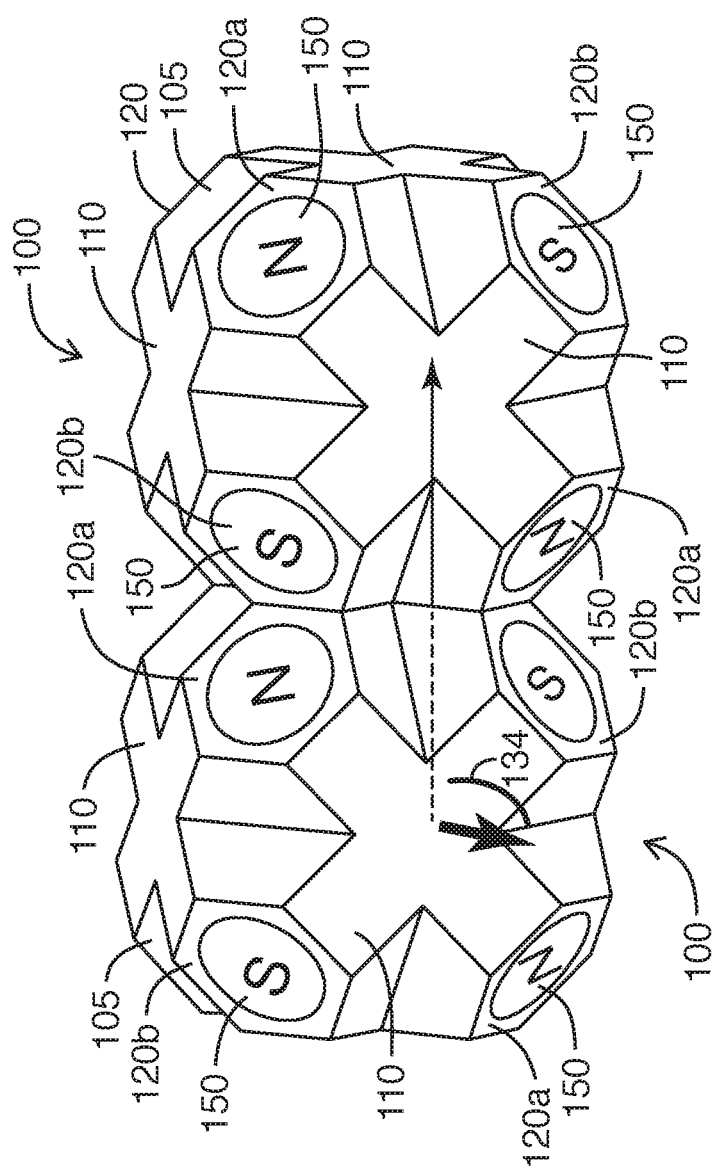
FIG. 1 is a perspective view of a base unit in accordance with one embodiment, coupled to another similar base unit in a first configuration.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As discussed above, known physical molecular modelling kits may have one or more shortcomings. For example, assembling bonds using typical physical models (e.g. by rearranging sticks and/or balls) may be characterized as slow, tedious, and/or inconsistent with or counter to physical reality, where e.g. attractive and repulsive forces act in space, and an energetic minimum structure naturally falls into place. Also, the coordination geometry around an atom is flexible in reality, but rigid in typical physical models. This may inhibit or prevent the smooth demonstration of chemical transformations using such models.

Figure 2:
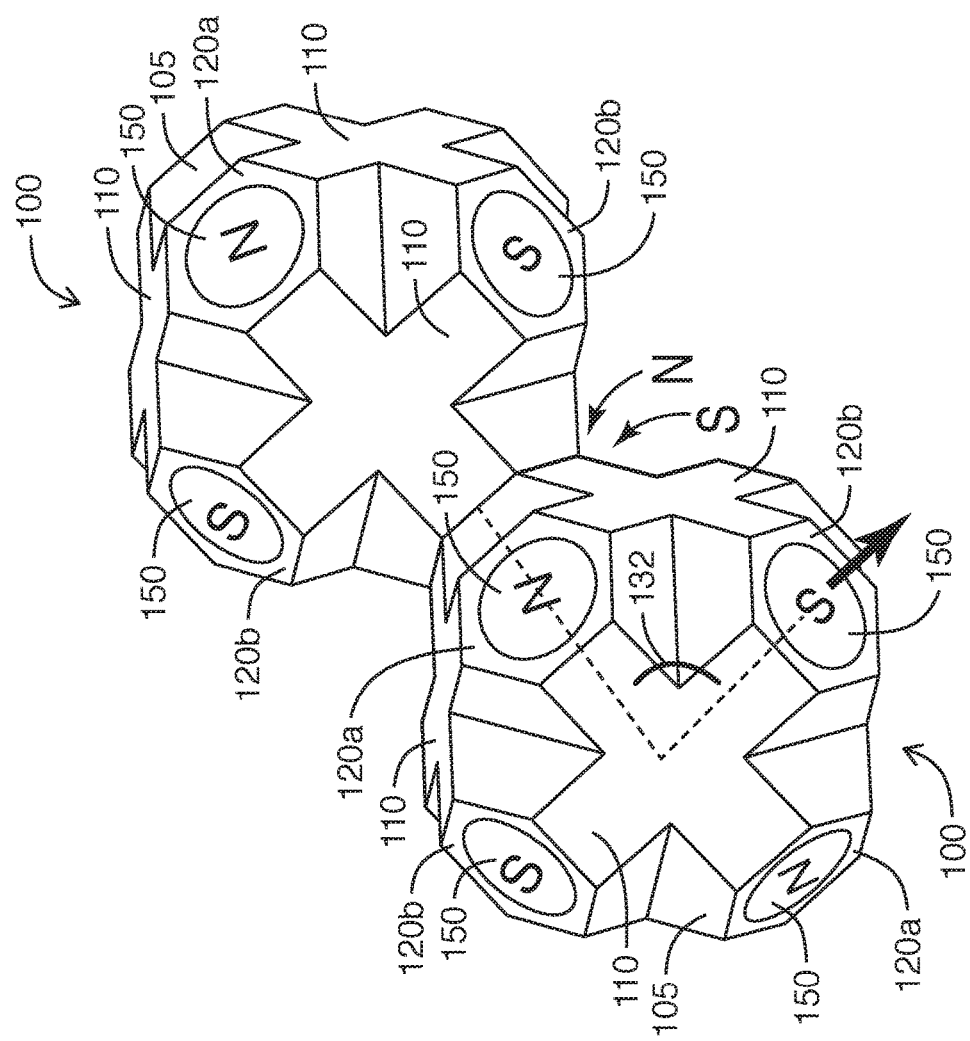
FIG. 2 is a perspective view of the base units of FIG. 1, coupled to each other in a second configuration.

FIGS. 1 and 2 illustrate an example of a base unit 100 that may address one or more limitations of existing molecular models by providing flexibility in the way atoms, modelled through appropriate base units that are substantially polyhedral in shape, connect. Each base unit 100 has a polyhedral body 105, which has a number of first attachment surfaces 110 defined on a first set of faces of the polyhedral body 105, and a number of second attachment surfaces 120 defined on a second set of faces of the polyhedral body 105.

In the illustrated example, the polyhedral body 105 of the base unit 100 is in the approximate shape of a truncated stella octangula (stellated octahedron). In this shape, an internal angle 132 of 109.5 degrees is provided between certain second attachment surfaces 120 (see e.g. FIG. 2), and an internal angle 134 of 90 degrees is provided between certain first attachment surfaces 110 (see e.g. FIG. 1). In alternative embodiments, the polyhedron underlying a base unit 100 may be any polyhedron that is substantially cubic/octahedral in symmetry (exact or approximate point group $O_h$), such as, for example, cube or truncated cube, octahedron, cuboctahedron, great rhombicuboctahedron, small rhombicuboctahedron, or stella octangula (stellated octahedron). The polyhedral shape may be rounded, further truncated, and/or endowed with one or more surface features, as discussed further below.

In the example illustrated in FIGS. 1 and 2, a magnet is positioned relative to each second attachment surface 120, with a North pole (illustrated as N) provided at second attachment surfaces 120a, and a South pole (illustrated as S) provided at second attachment surfaces 120b. In the illustrated example, disc magnets 150 are positioned flush with the second attachment surfaces 120 to provide the specified magnetic polarities. Alternatively, magnetic fields may be created using rod magnets, ring magnets, or magnets of any other suitable shape. For example, one or more magnets may be secured to or embedded in faces of the polyhedral body 105, or they may be positioned below the faces (i.e. within the body 105).

Alternatively, polyhedral body 105 may be made from a magnetic material (such as bonded SmCo, bonded SrFerrite or bonded NdFeB, for example, or a magnetic composite material) and magnetized with the desired multipole (such as quadrupole or octupole) moment.

In the example illustrated in FIGS. 1 and 2, the magnets are arranged such that the magnetic poles substantially point towards the corner of a cube, and in a preferred embodiment in which the North and South poles alternate, such that the North poles form a tetrahedron and the South poles also form a tetrahedron. An advantage of this arrangement is that the resulting geometry allows for connections between base units that may be particularly useful for modeling of molecules.

In FIG. 1, the base units 100 are connected or coupled to each other in a configuration in which a first attachment surface 110 of one of the base units abuts a first attachment surface 110 of the other base unit. In this configuration, a quadrupole-to-quadrupole attraction between the magnets proximate the abutting surfaces releasably retains the base units in contact with each other by resisting a separating force applied perpendicular to the abutting surfaces. However, due to the quadrupole-to-quadrupole attraction, rotation of one of the base units relative to the other base unit is inhibited due to the interaction of the magnetic fields. More specifically, the quadrupole-to-quadrupole attraction can be characterized as projecting outward from a polyhedral face of body 105 but has no magnetic poles directly on that axis. Rather, magnetic attractions (four North-South pairs) exist to the sides of this axis. If one base unit 100 in FIG. 1 is rotated by a small angle about the axis pointing to the other double-bonded (connected via quadrupole-to-quadrupole attraction) base unit 100, the result of such a rotation will be that the magnetic attraction between poles is reduced, resulting in a torque that increases with increasing rotation angles, as long as rotation angles are relatively small (e.g. less than approximately 45 degrees). After a small forced rotation, the torque will automatically reset the torsion angle to zero. Such a connection has in-built resistance to rotation. Also, rotating one of the base units relative to the other base unit by about 90 degrees would result in an alignment of magnets with similar polarities (N-N and S-S), and the resulting repulsive forces would promote separation of the (formerly) abutting first attachment surfaces 110.

In FIG. 2, the base units 100 are connected or coupled to each other in a configuration in which a second attachment surface 120a of one of the base units abuts a second attachment surface 120b of the other base unit. In this configuration, a pole-to-pole attraction between the magnets proximate the abutting surfaces 120 releasably retains the base units in contact with each other by resisting a separating force applied perpendicular to the abutting surfaces. Notably, this pole-to-pole attraction does not significantly resist a rotation or torque applied in a plane parallel to the abutting surfaces. Thus, the base units may be rotated or 'spun' relative to each other while the abutting second attachment surfaces remain in contact with each other.

It will be appreciated that base units 100 may be coupled to each other in configurations similar to FIG. 2 by bringing any two second attachment surfaces with opposing polarities into contact with each other, and that base units 100 may be coupled to each other in configurations similar to FIG. 1 by bringing two first attachment surfaces into contact with each other in an orientation in which a quadrupole-to-quadrupole attraction is present.

Providing a base unit 100 that can be releasably coupled to other base units 100 using magnets (and/or other attachment means) integrated into the base unit may have one or more advantages. For example, since separate components (e.g. rods) are not required to couple the base units to each other, assembling and/or reconfiguring a molecular model made from the base units may be characterized as simpler and/or less tedious.

Also, providing a base unit 100 that is magnetically coupleable to another base unit in a first configuration in which rotation of the base units relative to each other is inhibited, and that is magnetically coupleable to the another base unit in a second configuration in which rotation of the base units relative to each other is not inhibited, may have one or more advantages. For example, the fact that single bonds can rotate freely and double bonds cannot is consistent with the physics and chemistry of real molecules and has important real-world applications. For example, there is only one type (isomer) of 1,2-dichloroethane but, by virtue of restricted rotation, there exist two isomers of 1,2-dichloroethylene. This is but one of many thousands of examples where base units as disclosed herein may help e.g. a chemistry student to quickly grasp important concepts of organic stereochemistry. Other uses of the base units 100 are also apparent where conventional molecular models fail.

Preferably, base units 100 may be coupled to each other via magnetic attraction. Preferably, the magnetic attraction is strong enough so that if the respective attachment surfaces are brought into close proximity with each other, the magnetic attraction will bring the surfaces into contact without the application of further external forces.

Base units 100 may be manufactured from any suitable material, such as plastic (e.g. ABS, polyethylene, polypropylene, hard PVC, PET, nylon, polycarbonate, and others), wood, rubber (e.g. natural rubber or styrene-butadiene rubber, among others), rubber-like material (e.g. soft PVC, silicone, Tango™, among others), rubber-coated materials, plastic-coated materials, and/or composite materials. As noted above, magnets 105 may be provided as separate components that are secured to or embedded in polyhedral body 105. Alternatively, polyhedral body 105 may be made from a magnetic material (such as bonded SmCo, bonded SrFerrite or bonded NdFeB, for example, or a magnetic composite material) and magnetized with the desired multipole (such as quadrupole or octupole) moment.

Also, a base unit 100 may be of any suitable size. For example, smaller sizes—e.g. having an approximate spherical volume with a radius of about 0.5 cm, 1 cm, 2 cm, or 3 cm (or any value in between these values)—may be considered suitable for a chemistry student's self-study, while larger sizes—e.g. having an approximate spherical volume with a radius of about 3 cm, 4 cm, or 5 cm (or any value in between these values) or larger may be considered suitable for classroom teaching, e.g. for demonstration in large classes.

Figure 3:
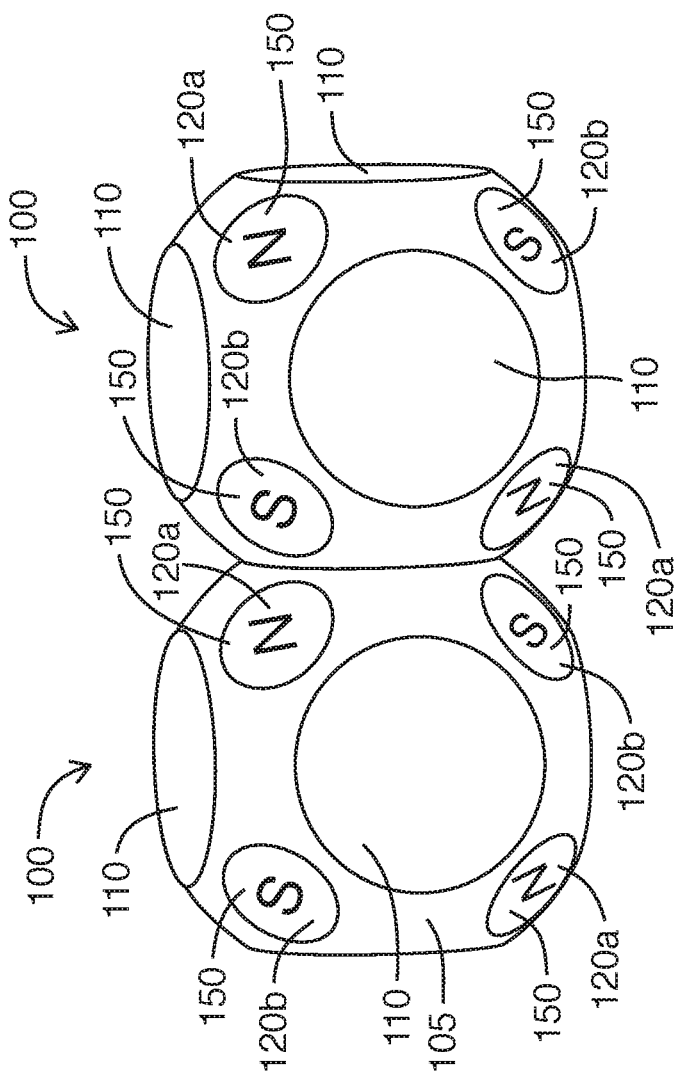
FIG. 3 is a perspective view of a base unit in accordance with another embodiment, coupled to another similar base unit in a first configuration.
Figure 4:
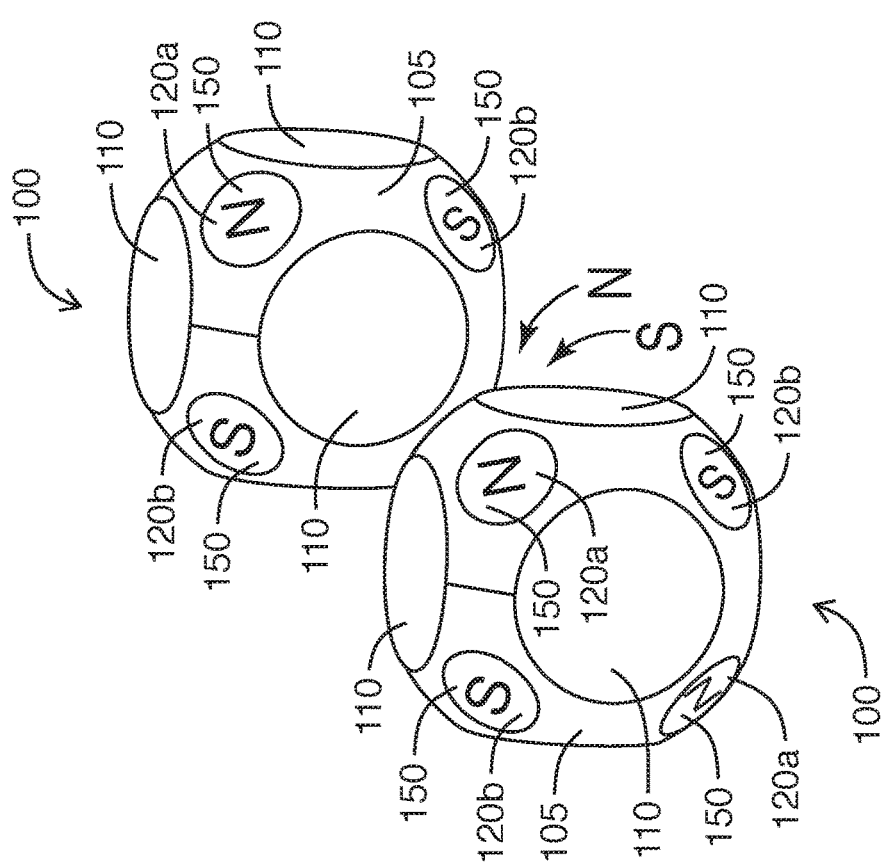
FIG. 4 is a perspective view of the base units of FIG. 3, coupled to each other in a second configuration.

FIGS. 3 and 4 illustrate another example of base units 100. Elements having similar structure and/or performing similar function as those in the example base unit illustrated in FIGS. 1 and 2 are numbered similarly, and will not be discussed further.

In the example illustrated in FIGS. 3 and 4, the polyhedral body 105 of the base unit 100 is a rounded version of a truncated cube. In the illustrated example, disc magnets 150 are positioned flush with the second attachment surfaces 120 to provide the specified magnetic polarities.

In FIG. 3, the base units 100 are connected or coupled to each other in a configuration in which a first attachment surface 110 of one of the base units abuts a first attachment surface 110 of the other base unit. In this configuration, due to the quadrupole-to-quadrupole attraction, rotation of one of the base units relative to the other base unit is inhibited due to the interaction of the magnetic fields. In FIG. 4, the base units 100 are connected or coupled to each other in a configuration in which a second attachment surface 120a of one of the base units abuts a second attachment surface 120b of the other base unit. In this configuration, the base units may be rotated or 'spun' relative to each other while the abutting second attachment surfaces remain in contact with each other.

Figure 5:
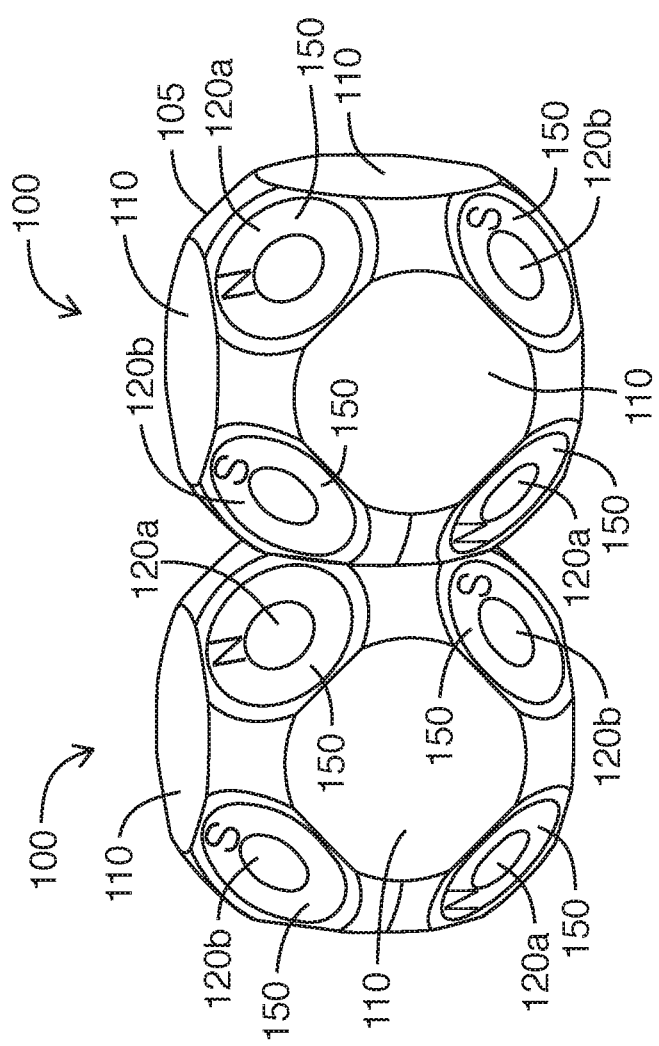
FIG. 5 is a perspective view of a base unit in accordance with another embodiment, coupled to another similar base unit in a first configuration.
Figure 6:
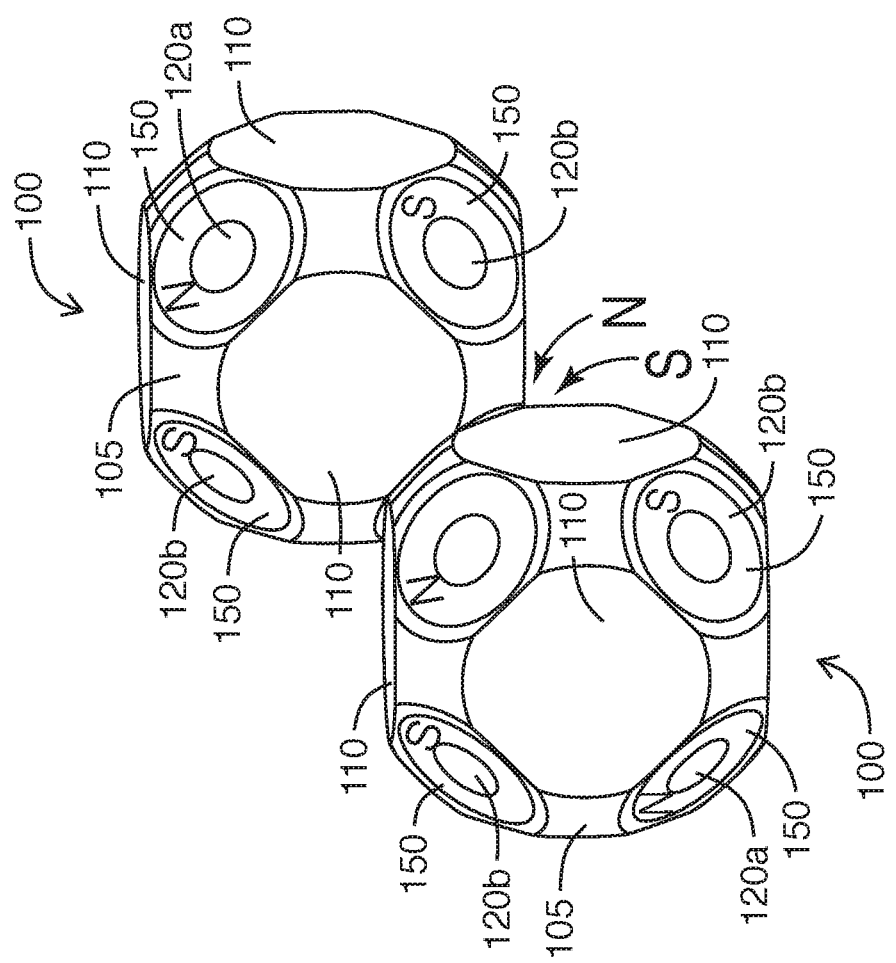
FIG. 6 is a perspective view of the base units of FIG. 5, coupled to each other in a second configuration.

FIGS. 5 and 6 illustrate another example of base units 100. Elements having similar structure and/or performing similar function as those in the example base unit illustrated in FIGS. 1 and 2 are numbered similarly, and will not be discussed further.

In the example illustrated in FIGS. 5 and 6, the polyhedral body 105 of the base unit 100 is a rounded version of a truncated cube, and ring magnets 150 are positioned flush with the second attachment surfaces 120 to provide the specified magnetic polarities.

In FIG. 5, the base units 100 are connected or coupled to each other in a configuration in which, due to the quadrupole-to-quadrupole attraction, rotation of one of the base units relative to the other base unit is inhibited due to the interaction of the magnetic fields. In FIG. 6, the base units 100 are connected or coupled to each other in a configuration in which the base units may be rotated or 'spun' relative to each other while the abutting second attachment surfaces remain in contact with each other.

Figure 7:
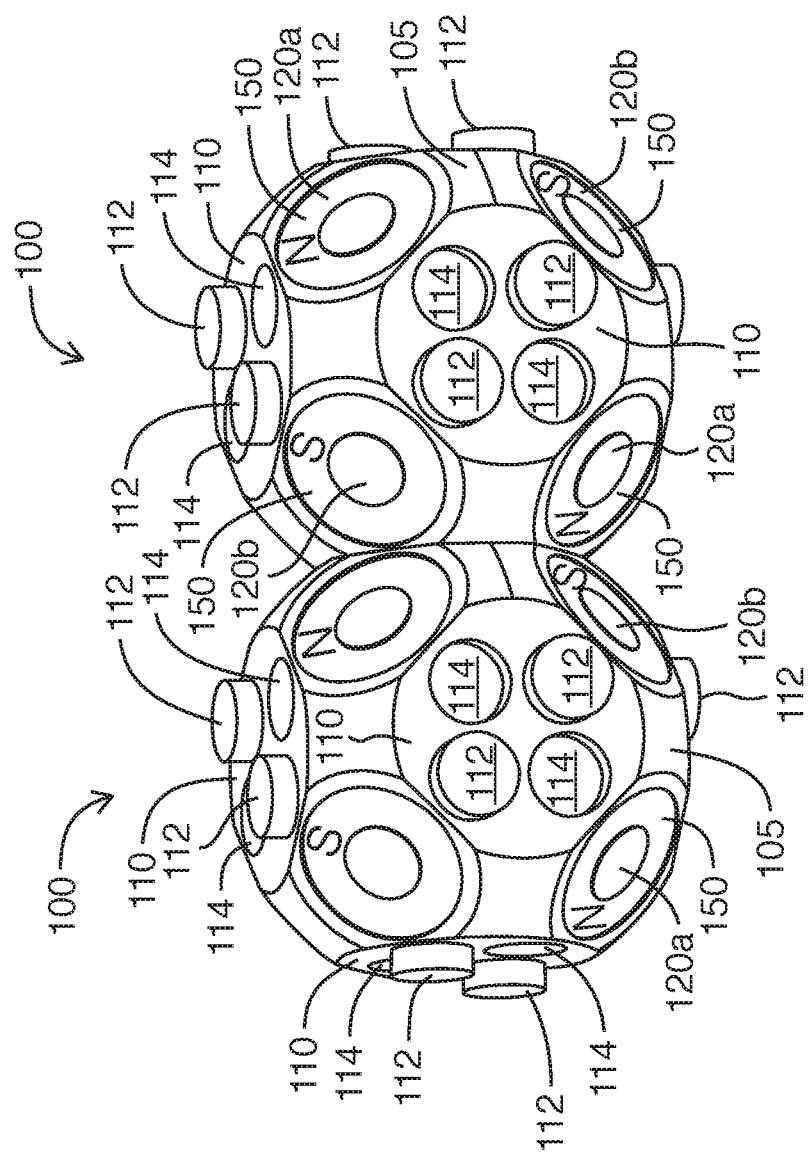
FIG. 7 is a perspective view of a base unit in accordance with another embodiment, coupled to another similar base unit in a first configuration.
Figure 8:
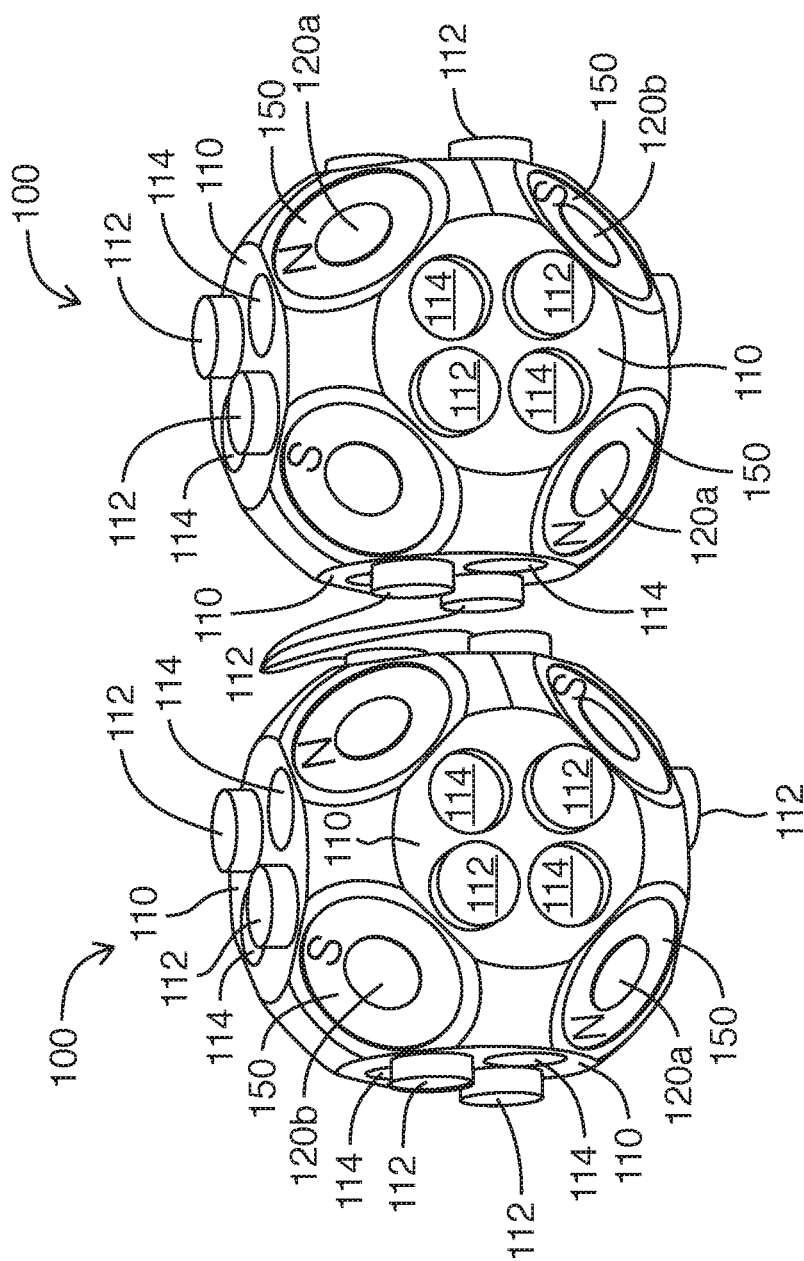
FIG. 8 is a perspective view of the base units of FIG. 7, separated from each other.

FIGS. 7 and 8 illustrate another example of base units 100. Elements having similar structure and/or performing similar function as those in the example base unit illustrated in FIGS. 1 and 2 are numbered similarly, and will not be discussed further. In this embodiment, the first attachment surfaces are provided with convex and concave surface features that may engage complementary surface features on other first attachment surfaces. These surface features may promote a more secure coupling between the base units, and/or inhibit rotation of the base unit relative to another unit in the model.

In the example illustrated in FIGS. 7 and 8, the polyhedral body 105 of the base unit 100 is a rounded version of a truncated cube, and ring magnets 150 are positioned flush with the second attachment surfaces 120 to provide the specified magnetic polarities.

Also, each first attachment surface 110 has a number of projections 112 that extend generally perpendicular to the face of the polyhedral body 105, and a number of recesses 114 that have a depth generally perpendicular to the face of the polyhedral body 105. In the illustrated example, two projections 112 and two recesses 114 are shown, although more or fewer projections/recesses may be provided in alternative embodiments. The projections 112 and recesses 114 are also illustrated as generally cylindrical projections/recesses, although other suitable shapes may be used. Also, the projections 112 and recesses 114 are illustrated as having similar shapes and similar heights/depths, although this may not be the case in alternative embodiments.

In FIG. 8, the base units 100 are separated from each other in an orientation in which a first attachment surface 110 of one of the base units is spaced from a first attachment surface 110 of the other base unit. As shown, the projections 112 and recesses 114 of each of the spaced first attachment surfaces 110 are aligned with complementary projections 112 and recesses 114 of the other first attachment surfaces 110. Notably, in this orientation the magnets 150 are aligned such that a quadrupole-to-quadrupole attraction between the magnets will releasably retain the base units in contact with each other when they are brought into contact, as illustrated in FIG. 7.

In the configuration illustrated in FIG. 7, rotation of one of the base units relative to the other base unit is inhibited due to the engagement of the projections 112 and recesses 114 of each of the first attachment surfaces 110, in addition to the rotation-inhibition resulting from the interaction of the magnetic fields that form the quadrupole-to-quadrupole attraction.

Figure 9:
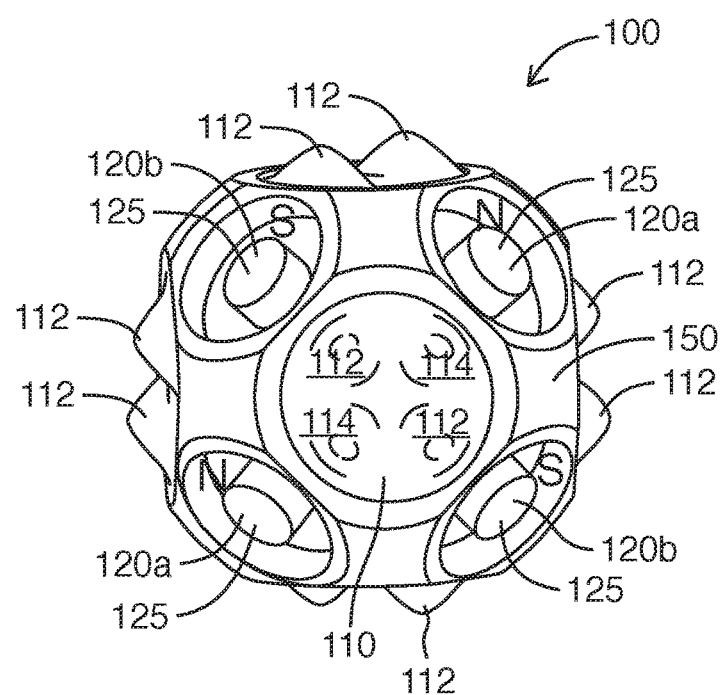
FIG. 9 is a perspective view of a base unit in accordance with another embodiment.

FIG. 9 illustrates another example of a base unit 100. Elements having similar structure and/or performing similar function as those in the example base unit illustrated in FIGS. 7 and 8 are numbered similarly, and will not be discussed further. In this embodiment, the polyhedral body 105 of the base unit 100 is a rounded version of a truncated cube, and ring magnets 150 (not shown) may be positioned around and secured to mounting projections 125 to provide the specified magnetic polarities. In alternative embodiments, mounting projections 125 may not be provided, and a paramagnetic or ferromagnetic material shaped as a ring, disk, cylinder, rod, or any other suitable shape may be fully or partially embedded into or attached to the surface of body 105.

In this example, the projections 112 are in the form of 'smoothed' cones extending generally perpendicularly outwardly from the face of the polyhedral body 105, and the recesses 114 are in the form of 'smoothed' conical intrusions extending generally perpendicularly inwardly from the face of the polyhedral body 105.

Figure 10:
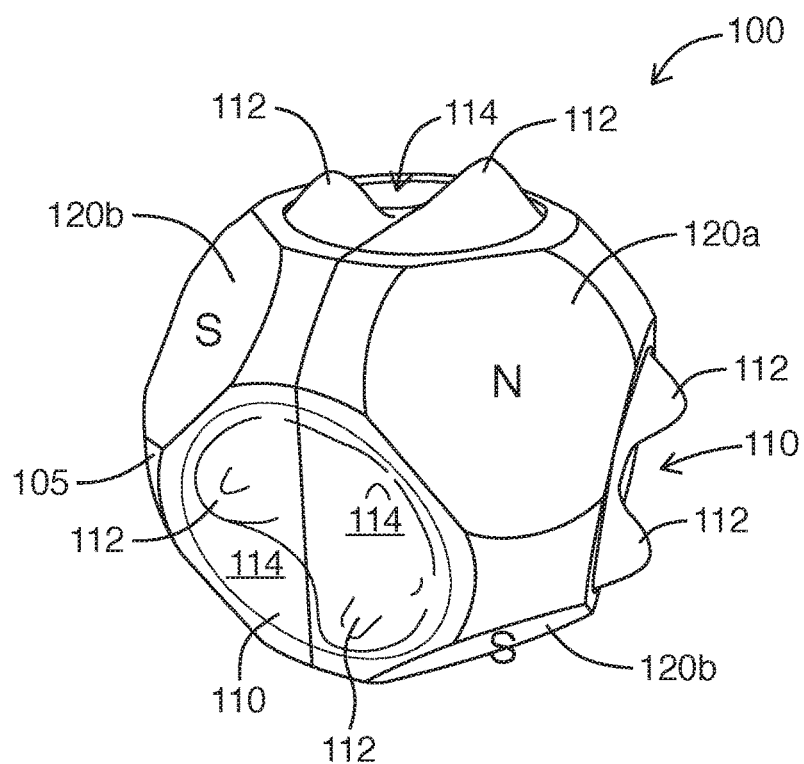
FIG. 10 is a perspective view of a base unit in accordance with another embodiment.
Figure 11:
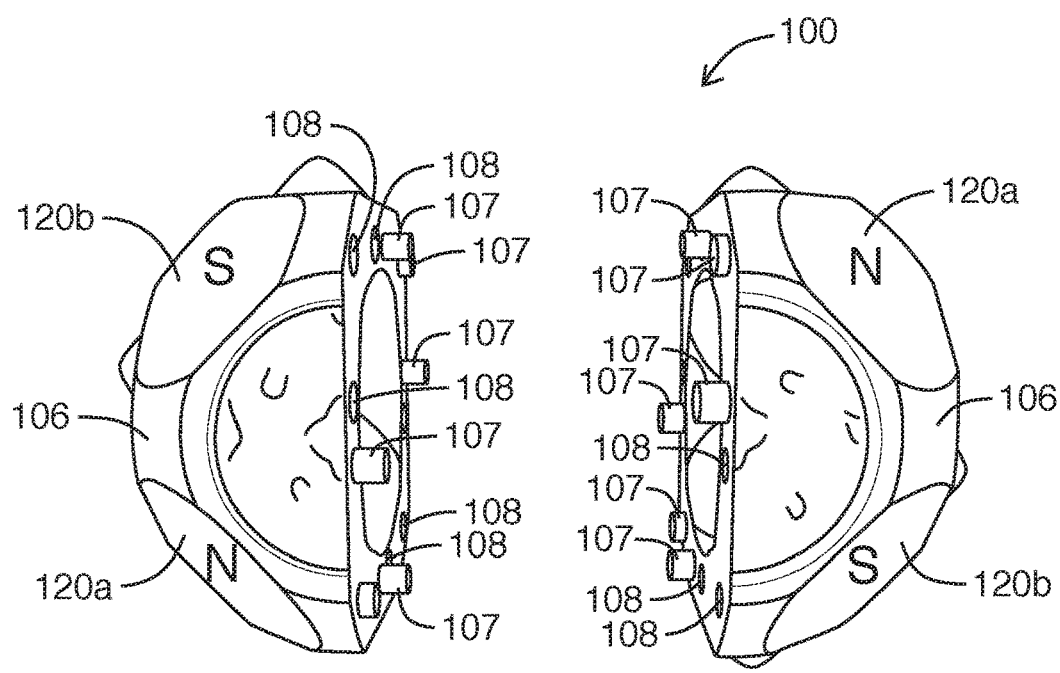
FIG. 11 is an exploded perspective view of the base unit of FIG. 10.

FIGS. 10 and 11 illustrate another example of a base unit 100. Elements having similar structure and/or performing similar function as those in the example base unit illustrated in FIGS. 7 and 8 are numbered similarly, and will not be discussed further.

In the example illustrated in FIG. 10, base unit 100 has a shape based on a rounded truncated cube. The first attachment surfaces have alternating convex-concave surface features (i.e. projections and recesses), which may be characterized as a 'wavy' surface texture. The second attachment surfaces are generally planar. Also a first set of second attachment surfaces each have a North polarity, and a second set of second attachment surfaces each have a South polarity.

In this example, the shape of the wavy surfaces reduces the symmetry of the rounded truncated cube from exactly $O_h$ to only approximately $O_h$ but exactly $T_d$. While the example shown has three concave indents close to each North pole and three convex protrusions close to each South pole, other configurations are possible. For example, a variant base unit 100 may have three concave indents close to each South pole and three convex protrusions close to each North pole.

FIG. 11 illustrates an example of how the polyhedral body of a base unit as shown in FIG. 10 may be formed of two separate body portions 106. An advantage of this design is that magnets may be positioned internally in one or both of the body portions 106, and the body portions 106 may then be secured to each other using e.g. mechanical engagement (such as by press-fitting pins 107 into holes 108), an adhesive, or any other suitable manufacturing method. It will be appreciated that the configuration illustrated in FIG. 11 (e.g. a generally central parting line and the illustrated set of alignment pins 107 and holes 108) is an example, and that other suitable configurations could be used in alternative embodiments.

Molecules may be modeled from one or more base units that are connectable or couplable to one or more other base units, where each base unit represents an atom in the modeled molecule. For example, a base unit 100 may have three, four, five, six, seven, eight, nine, ten, eleven, twelve, thirteen, fourteen, fifteen, sixteen, seventeen, eighteen, nineteen, or twenty attachment surfaces. Each base unit 100 is capable of connecting to one or more other base units in order to represent atoms in variable geometries. For example, a user (e.g. a student or instructor) of the model kit may couple two or more base units to each other in a particular relative configuration, depending on which molecular structure is meant to be modeled.

A molecular modeling kit may be packaged and/or sold as a unit, and may include any suitable number of base units 100. Each base unit 100 in the kit has at least two attachment surfaces capable of being physically and/or magnetically coupled to attachment surfaces on other base units. In some embodiments, each base unit 100 in the kit may be substantially identical. Preferably, two or more different designs of base units 100 are included in a kit. For example, a kit may contain a first set of base units 100 of a similar shape, size, and/or colour, and a second set of base units 100 of a shape, size, and/or colour that is different from the first set of base units. In some embodiments, in addition to base units 100, a kit may include one or more capping units.

Capping units differ from base units in that they have fewer attachment points than base units. Preferably, a capping unit has only one attachment surface. Such capping units may be used to represent atoms that often form only single bonds (e.g. hydrogen atoms and/or halogen atoms). In contrast, base units may be used to model many or all other atoms (such as carbon, oxygen, nitrogen, and the metals). Recognizing that a model may be somewhat imprecise, most if not all elements of the periodic table can be modeled with a base unit as disclosed herein. In this respect, most of the common geometries, for all elements, can be modeled (although it will be appreciated that there is no guarantee that all geometries that have been observed for an element in nature can be modeled). For example, geometries that can be modelled using base units as disclosed herein include, but are not limited to, linear, trigonal, tetrahedral, square-planar, square pyramidal, approximately trigonal bipyramidal, octahedral, and cubic eight-coordinate.

Figure 12:
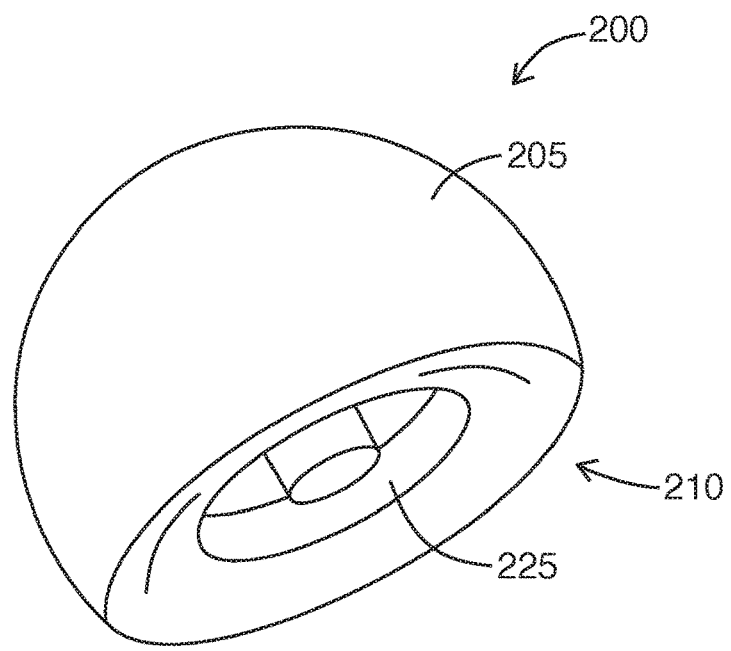
FIG. 12 is a perspective view of a capping unit in accordance with one embodiment.

FIG. 12 illustrates an example of a capping unit 200 that has a body 205 and a single attachment surface 210 defined on a face of the body 205. In the illustrated example, the body 205 of the capping unit 200 is in the approximate shape of a truncated sphere, e.g. an essentially spherical convex shape with one flat or concave surface. In alternative embodiments, a capping unit 200 may have any suitable shape. For example, a capping unit 200 may resemble a mushroom cap in shape.

In the illustrated example, body 205 also has a ring-shaped groove 225, in which a ring magnet or a ring-shaped piece of a (not permanently magnetized) paramagnetic or ferromagnetic material, such as iron (not shown), may be secured. This may allow the capping unit 200 to be secured to a base unit 100 via e.g. a pole-to-pole magnetic attraction. In alternative embodiments, body 205 may not have a ring-shaped groove 225, and the paramagnetic or ferromagnetic material may not be shaped as a ring, but rather as a disk or cylinder or rod or any suitable shape, which may be fully or partially embedded into or attached to the surface of body 205. Like base units 100, capping units 200 may be manufactured from any suitable material, and may be of any suitable size.

As noted above, a molecular modeling kit preferably includes two or more different designs of base units 100. Each unique polyhedral base unit 100 is associated with a set of specific angles between vectors from the center of the base unit 100 to the centers of the faces of the polyhedral body 105 (e.g. to the centres of the attachment surfaces 110, 120). Each such angle represents a bond angle the base unit 100 is able to model. Such angles are often expressed in terms of hybridization (e. g., a 109.5 deg angle is associated with $sp^3$ hybridization). The base units 100 are preferably chosen to be substantially cubic/octahedral in symmetry (e.g. exact or approximate point group $O_h$, or any exact or approximate subgroup of $O_h$, for example $T_d$), as this leads to angles between units that are useful for modeling real molecules. Among the angles between the center of the base unit and the centers of faces are the following (exact or approximate): 90 degrees, 180 degrees, 109.5 degrees, 125.25 degrees. The angles may be modeled exactly or with various tolerances. In some embodiments, the angles are ±1 degree, ±2 degrees, ±3 degrees, ±4 degrees, ±5 degrees, for example. Coupling between two base units 100 occurs along axes that are perpendicular or approximately perpendicular to the faces coupled.

For example, using specific faces or attachment surfaces to couple to neighboring units, a base unit 100 could be coupled to four other base units 100 with bond angles of each 109.5 degrees (or approximately 109.5 degrees), thus representing a tetrahedrally four-coordinate atom, as found, for example, in the carbon atom in methane or ethane.

Using a different set of faces or attachment surfaces, a base unit 100 could be coupled to three other base units (e.g. atoms represented with either base units 100 or capping units 200) such that the set of four units/atoms is perfectly planar. One way to do this would involve the base unit 100 binding to two other base units 100 using a 109.5 degree bond angle; a fourth unit is attached to the initial base unit 100 such that the two new angles created are 125.25 degree. This planar arrangement closely approximates the geometry in three-coordinate carbon, for example in ethylene ($sp^2$ hybridization). Linear carbon (sp hybridization) such as in acetylene can be realized using connections at 180 degrees.

Figure 13:
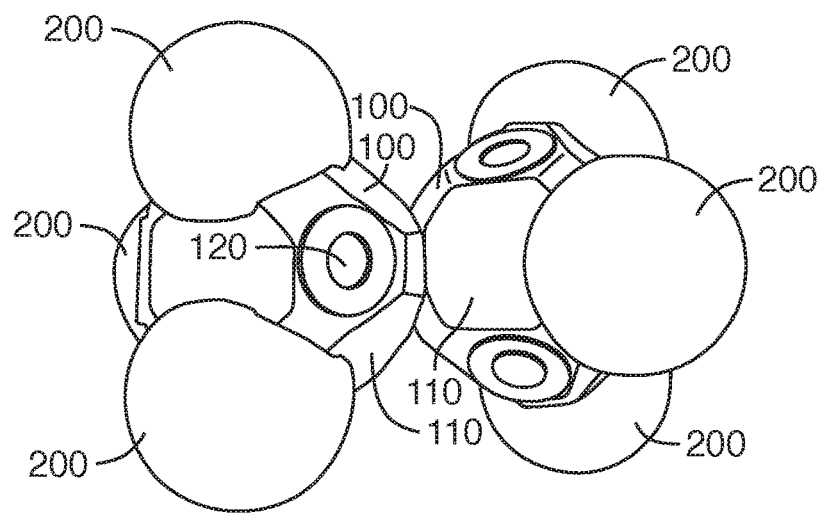
FIG. 13 is a perspective view of two of the base units of FIG. 5, and six capping units in accordance with another embodiment, coupled to each other to model an ethane molecule.
Figure 14:
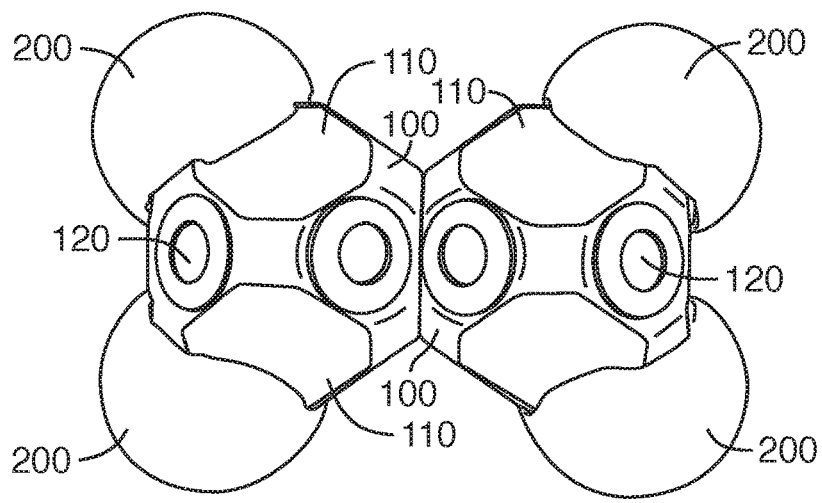
FIG. 14 is a perspective view of two of the base units and four of the capping units of FIG. 13, coupled to each other to model an ethylene molecule.
Figure 15:
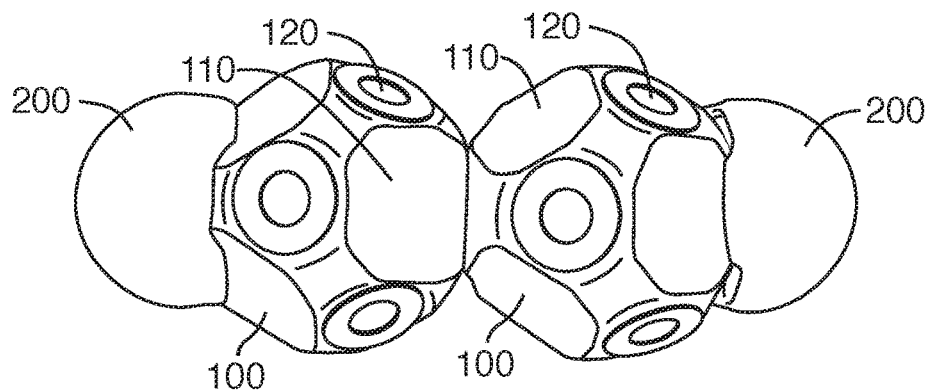
FIG. 15 is a perspective view of two of the base units and two of the capping units of FIG. 13, coupled to each other to model an acetylene molecule.

This versatility that allows base units 100 to create structures having, among others, $sp^3$, $sp^2$, or sp hybridization, is illustrated in FIGS. 13 to 15.

In FIG. 13, a model of the ethane molecule is formed using two base units 100 (each representing a carbon atom) coupled to each other in a configuration in which a second attachment surface 120a of one of the base units abuts a second attachment surface 120b of the other base unit, and three capping units 200 (each representing a hydrogen atom) coupled to each base unit 100.

In FIG. 14, a model of the ethylene molecule is formed using two base units 100 (each representing a carbon atom) coupled to each other in a configuration in which a first attachment surface 110 of one of the base units abuts a first attachment surface 110 of the other base unit, and two capping units 200 (each representing a hydrogen atom) coupled to each base unit 100. Notably, in the illustrated examples the (pole-to-pole) coupling between the base units 100 shown in FIG. 13 does not inhibit rotation of the base units relative to each other, allowing the base units to be reconfigured from the configuration of FIG. 13 to the configuration of FIG. 14 without separating or decoupling the base units from each other.

In FIG. 15, a model of the acetylene molecule is formed using two base units 100 (each representing a carbon atom) coupled to each other in a configuration in which a second attachment surface 120a of one of the base units abuts a second attachment surface 120b of the other base unit, and one capping unit 200 (representing a hydrogen atom) coupled to each base unit 100.

Further examples for using the base units to model organic (carbon-based) chemistry are illustrated in FIGS. 16A-16C and FIGS. 17A-17B. Unless otherwise specified, in these examples base units 100 are used to represent carbon atoms, and capping units 200 are used to represent hydrogen atoms.

FIGS. 16A-16C illustrate the transformation of a modeled molecule of n-butane into a modeled molecule of 1-butene. This transformation is an example of how a chemical reaction (here dehydrogenation of n-butane to form 1-butene) may be modeled in a 'smooth' fashion using the base units 100 as disclosed herein. As this example illustrates, each base unit 100 may be characterized as having intrinsic flexibility to adopt a large number of chemically useful bonding modes. Notably, separate or specialized pieces may not be required for atoms of a particular bonding state, and no separate parts are needed as bonds (e.g., springs, rods, etc.).

In FIG. 16A, a model of n-butane is shown, in which base units 100 are coupled to each other in a configuration in which second attachment surfaces of the base units abut second attachment surfaces of the other base units to model the bonds. In this molecule, $H_3C-CH_2-CH_2-CH_3$, both the carbons in the $CH_3$ groups and the carbons in the $CH_2$ groups are tetrahedrally (that is, involving bond angles of 109.5 deg) surrounded by four bonded atoms: a $CH_3$ carbon is surrounded by three hydrogen atoms and one carbon atom; a $CH_2$ carbon is surrounded by two hydrogen atoms and two carbon atoms.

Decoupling two hydrogen atoms (capping units) from the model of FIG. 16A leads to the structure illustrated in FIG. 16B. In FIG. 16B, all bond angles are still 109.5 degrees, which does not correspond to the stable structure of n-butene with a C1-C2-C3 bond angle (where the double bond is between C1 and C2) of close to 120 deg. Further, in real 1-butene, the $H_2C=CH-C$ unit is completely planar. The correct, stable structure of 1-butene, represented by the model illustrated in FIG. 16C, may be obtained from the structure illustrated in FIG. 16B by 'flipping' one base unit 100 from the configuration of FIG. 16B in which second attachment surfaces 120 of the base units abut (e.g. coupled by a magnetic pole-to-pole attraction) to the configuration of FIG. 16C in which first attachment surfaces 110 of the base units abut (e.g. coupled by a magnetic quadrupole-to-quadrupole attraction). Notably, this reconfiguration or reorientation of the base units 100 can be accomplished while maintaining contact between the base units (e.g. in one motion), and with the same units used to model n-butane. Also, no extra parts are needed.

Figure 17A:
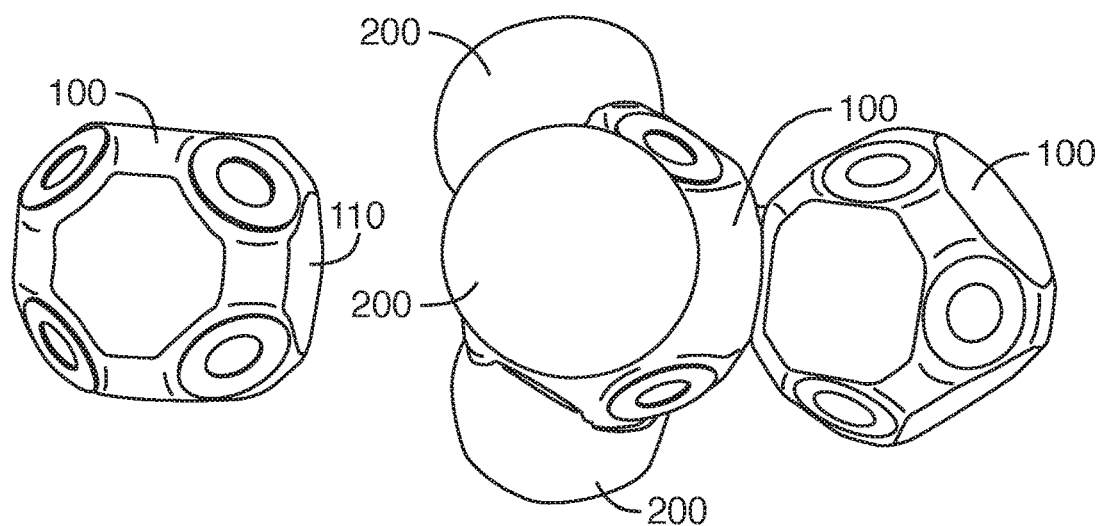
FIG. 17A is a perspective view of three of the base units and three of the capping units of FIG. 13, with two of the base units coupled to each other to model a four-coordinate carbon structure.
Figure 17B:
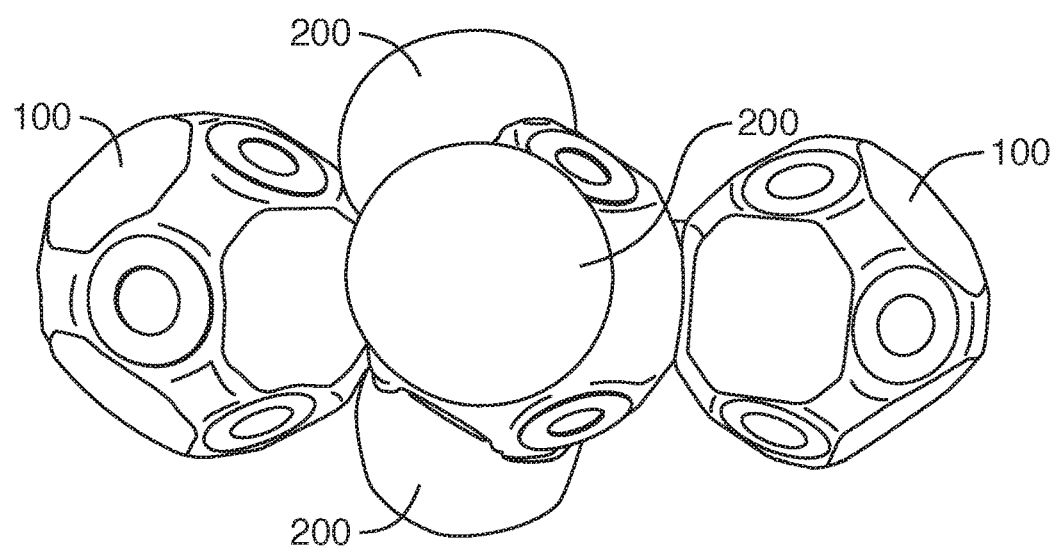
FIG. 17B is a perspective view of the base units and capping units of FIG. 17A, with the base units coupled to each other to model a five-coordinate carbon structure.

FIGS. 17A and 17B illustrate an example of a structure having five-coordinate carbon (FIG. 17B) can be formed from four-coordinate carbon (FIG. 17B). Since structures such as the example shown in FIG. 17B are involved in the bimolecular nucleophilic substitution at four-coordinate carbon, which is an important type of organic reaction, FIGS. 17A and 17B demonstrate a use of the base units 100 in modeling reaction mechanisms.

The base units 100 disclosed herein may be used not only to model organic chemistry, the chemistry of carbon compounds, but also to model inorganic chemistry, including the chemistry of the metals. For example, using a combination of attachment angles of 180 degrees and 90 degrees, octahedral, square-planar, and square pyramidal structures, as common in the structures of the metallic elements, can be realized.

Figure 18:
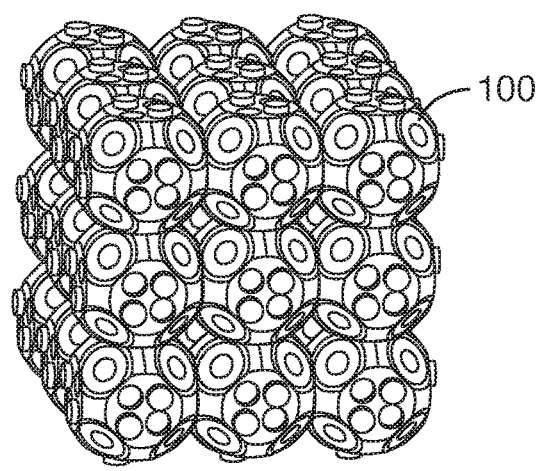
FIG. 18 is a perspective view of twenty-seven of the base units of FIG. 7, coupled to each other to model a-polonium.

FIG. 18 illustrates an example of a cubic crystal structure (a-polonium) formed using 27 base units 100, in which first attachment surfaces 110 of the base units abut (e.g. coupled by a magnetic quadrupole-to-quadrupole attraction).

Figure 19:
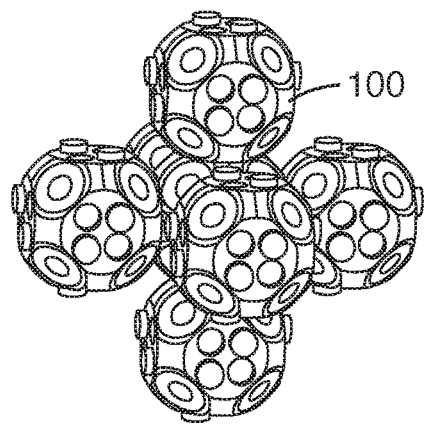
FIG. 19 is a perspective view of seven of the base units of FIG. 7, coupled to each other to model an octahedral metal complex.

FIG. 19 illustrates an example of an octahedral molecule formed using seven base units 100, in which first attachment surfaces 110 of the base units abut (e.g. coupled by a magnetic quadrupole-to-quadrupole attraction).

Figure 20:
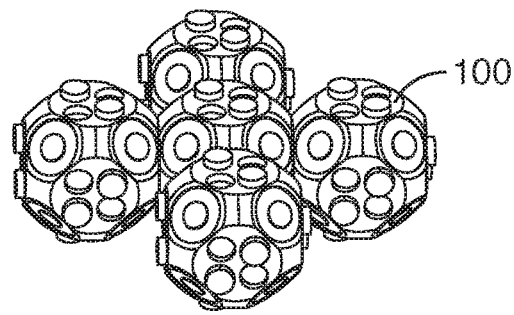
FIG. 20 is a perspective view of five of the base units of FIG. 7, coupled to each other to model a square-planar metal complex.

FIG. 20 illustrates an example of a square-planar molecule formed using five base units 100, in which first attachment surfaces 110 of the base units abut (e.g. coupled by a magnetic quadrupole-to-quadrupole attraction).

It will be appreciated that the molecules models illustrated herein are non-limiting examples of geometries possible with the base units 100. The base units 100 and/or capping units 200 may be used to easily model (and to easily change and interconvert) a very large and diverse number of structures.

In FIGS. 13 to 17B, base units 100 according to the examples shown in FIGS. 5 and 6 are used to illustrate how molecular models may be constructed using base units 100, and in FIGS. 18 to 20, base units 100 according to the examples shown in FIGS. 7 and 8 are used to illustrate how molecular models may be constructed using base units 100. It will be appreciated that the illustrated models may alternatively be constructed using any alternative embodiment of base unit 100, such as base units as illustrated in any of FIGS. 1 to 11. The choice of a particular embodiment is for illustration purposes only.

Many properties of real molecules may be reproduced using base units 100 and/or capping units 200. For example, in nature, rotation around carbon-carbon single bonds is facile. In the n-butane molecule, where only single bonds exist, rotation around each bond is rapid. In the model of the n-butane molecule (illustrated in FIG. 16A), rotation around each pole-to-pole connection between base units 100 is facile. On the other hand, rotation around double bonds in molecules is hindered. In embodiments of base units with magnetic coupling, double bonds are represented by quadrupole-to-quadrupole connections. Considerable force is needed to rotate around such connections. Examples are the C=C double bond in ethylene (FIG. 14) or 1-butene (FIG. 16C).

In some embodiments, the exterior of the base units 100 and/or capping units 200 may be color-coded. For example, the units 100, 200 may be manufactured from a colored material, have a color painted or otherwise applied to some or all of the exterior surface, or may include one or more light sources (e.g. LEDs) configured to emit colored light. An advantage of providing color-coded base units 100 and/or capping units 200 is that color may be used to encode information about the element that is being represented by a base unit (e.g., black for carbon, red for oxygen).

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A base unit for use in forming a molecular model, the base unit comprising:
   a polyhedral body having a first set of faces defining a plurality of first attachment surfaces, and a second set of faces defining a plurality of second attachment surfaces; and
   at least one magnet positioned relative to the plurality of second attachment surfaces such that a first set of the plurality of second attachment surfaces has a North polarity, and a second set of the plurality of second attachment surfaces has a South polarity;
   wherein the base unit is magnetically coupleable to another unit in the molecular model in a first configuration in which rotation of the base unit relative to the another unit is inhibited, and
   wherein the base unit is magnetically coupleable to the another unit in a second configuration in which rotation of the base unit relative to the another unit is not inhibited.

2. The base unit of claim 1, wherein in the first configuration, a first attachment surface of the base unit abuts a first attachment surface of the another unit.

3. The base unit of claim 2, wherein each first attachment surface comprises at least one projection and at least one recess configured such that when that first attachment surface abuts a complementary first attachment surface of the another unit, the at least one projection and the at least one recess engage the complementary first attachment surface of the another unit.

4. The base unit of claim 1, wherein in the second configuration, a second attachment surface of the base unit abuts a second attachment surface of the another unit.

5. The base unit of claim 4, wherein each second attachment surface is generally planar, such that when that second attachment surface abuts a complementary second attachment surface of the another unit, the abutted surfaces do not inhibit rotation of the base unit relative to the another unit.

6. The base unit of claim 1, wherein the base unit and the another unit may be reoriented from the first configuration to the second configuration while maintaining contact between the base unit and the another unit.

7. The base unit of claim 1, wherein the polyhedral body has or approximates $O_h$ symmetry.

8. The base unit of claim 1, wherein the polyhedral body has or approximates $T_d$ symmetry.

9. The base unit of claim 1, wherein the polyhedral body comprises a truncated cube, an octahedron, a great rhombicuboctahedron, a small rhombicuboctahedron, a cuboctahedron, a stella octangula, or a truncated stella octangula.

10. The base unit of claim 1, wherein the first set of the plurality of second attachment surfaces comprises four second attachment surfaces spaced from each other to form a first tetrahedron, the second set of the plurality of second attachment surfaces comprises four second attachment surfaces spaced from each other to form a second tetrahedron, and wherein the first tetrahedron and the second tetrahedron form a cube.

11. The base unit of claim 1, wherein the at least one magnet comprises at least one of a disk magnet, a rod magnet, and a ring magnet.

12. The base unit of claim 1, wherein the another unit is substantially identical to the base unit.

13. A molecular modeling kit comprising two or more of the base units of claim 1.

14. The kit of claim 13, further comprising at least one capping unit, each of the at least one capping unit having fewer attachment surfaces than each of the base units.

15. The kit of claim 14, wherein each of the at least one capping unit has a single attachment surface.

16. The kit of claim 14, wherein the at least one capping unit comprises a permanent magnet.

17. The kit of claim 14, wherein the at least one capping unit comprises a paramagnetic or ferromagnetic material.

18. A base unit for use in forming a molecular model, the base unit comprising:
   a polyhedral body having a first set of faces defining a plurality of first attachment surfaces, and a second set of faces defining a plurality of second attachment surfaces, a first set of the plurality of second attachment surfaces having a North magnetic polarity, and a second set of the plurality of second attachment surfaces having a South magnetic polarity;
   wherein the base unit is magnetically coupleable to another base unit in a multipole-to-multipole orientation in which a first attachment surface of the base unit abuts a first attachment surface of the another base unit, and in which rotation of the base unit relative to the another unit is inhibited, and
   wherein the base unit is magnetically coupleable to the another base unit in a pole-to-pole orientation in which a second attachment surface of the base unit abuts a second attachment surface of the another base unit.

19. The base unit of claim 18, wherein the polyhedral body comprises a magnetic composite material magnetized to produce the North and South magnetic polarities.

20. The base unit of claim 18, further comprising at least one first magnet to produce the North magnetic polarities and at least one second magnet to produce the South magnetic polarities.

* * * * *